United States Patent [19]
Hawke et al.

[11] 4,207,723
[45] Jun. 17, 1980

[54] CANNING AND INSPECTION SYSTEM FOR NUCLEAR REACTOR FUEL AND REFLECTOR ELEMENTS

[75] Inventors: Basil C. Hawke, Solana Beach; Lewis A. Goldman, Cardiff, both of Calif.

[73] Assignee: General Atomic Company, San Diego, Calif.

[21] Appl. No.: 915,365

[22] Filed: Jun. 14, 1978

[51] Int. Cl.² ............................................. G21C 19/20
[52] U.S. Cl. .......................................... 53/281; 176/30
[58] Field of Search ...................... 53/281; 176/27, 30, 176/31, 32; 250/506, 507

[56] References Cited
U.S. PATENT DOCUMENTS

| | | | |
|---|---|---|---|
| 3,153,619 | 10/1964 | Ericsson et al. | 176/30 |
| 3,271,262 | 9/1966 | Hutchinson et al. | 176/30 |

Primary Examiner—Robert D. Baldwin
Attorney, Agent, or Firm—Fitch, Even & Tabin

[57] ABSTRACT

A system is disclosed for canning, inspecting and transferring to a storage area fuel and reflector elements from a nuclear reactor, which system includes a transfer chute, environmental chamber, conveyor and canning mechanism operative to remove and replace closures on containers into which fuel and reflector elements are inserted or from which stored elements are removed while maintaining a sealed gaseous environment and permitting visual and mechanical inspection of the elements by an operator located in a remote shielded area.

15 Claims, 12 Drawing Figures

CANNING AND INSPECTION SYSTEM FOR NUCLEAR REACTOR FUEL AND REFLECTOR ELEMENTS

The present invention relates generally to nuclear reactors, and more particularly to a novel system facilitating transfer, canning and inspection of fuel and reflector elements between a nuclear reactor vessel and a storage area while maintaining the elements in a gaseous environment sealed against egress of radioactive contaminants and ingress of air.

Nuclear reactors conventionally employ an active core which includes an array of fuel elements generally surrounded by reflector elements. It is a necessary incident to the operation of a nuclear reactor system to periodically remove radioactive elements, such as fuel and reflector elements, from the nuclear reactor and to transport such radioactive elements to a location remote from the nuclear reactor core for canning, inspection and storage. During handling of such fuel and reflector elements, it is important that personnel are adequately shielded from the radioactive elements themselves and from equipment which may be exposed to, and thereby contaminated by, the elements. It is equally important that the elements be maintained in a gaseous environment during transit, sealed against egress of radioactive contaminants and ingress of air.

One of the primary objects of the present invention is to provide a remotely controllable system which facilitates transfer of fuel and reflector elements between a reactor vessel core and a storage area while maintaining the elements in a gaseous environment sealed against egress of radioactive contaminants and ingress of air.

A more particular object of the present invention is to provide a novel system for canning and inspecting fuel and reflector elements of a nuclear reactor remote from the reactor vessel, while maintaining the elements in a desired gaseous environment.

Another object of the present invention is to provide a novel system for transferring, canning and inspecting fuel and reflector elements of a nuclear reactor, which system employs a transfer chute, environmental chamber, conveyor and canning mechanism operative to remove and replace the closures of containers in which the fuel and reflector elements are sealed, while maintaining a gaseous environment in the containers and permitting visual and mechanical inspection of the elements by operators located in a remote, shielded area.

A feature of the system in accordance with the present invention lies in the provision of an environmental chamber at the lower end of the transfer chute and in which a grapple is provided for removing the closure lids of containers disposed within chambers of an underlying conveyor, the grapple being operative to move the closure lids to a storage area and subsequently move the same or a new lid into a position for reattachment to the container.

A further feature of the system in accordance with the present invention lies in the provision of a seal forming arrangement wherein a sealed relation is effected between an opening in the lower end of the environmental chamber and an associated underlying conveyor chamber so that a predetermined gaseous environment may be maintained about an element being placed into or withdrawn from a container disposed within the conveyor chamber.

The various objects and advantages of the present invention, together with the organization and manner of operation thereof, will become apparent from the following detailed description of the invention when taken in conjunction with the accompanying drawings wherein like reference numerals designate like elements throughout the several views, and wherein:

Figure 1:
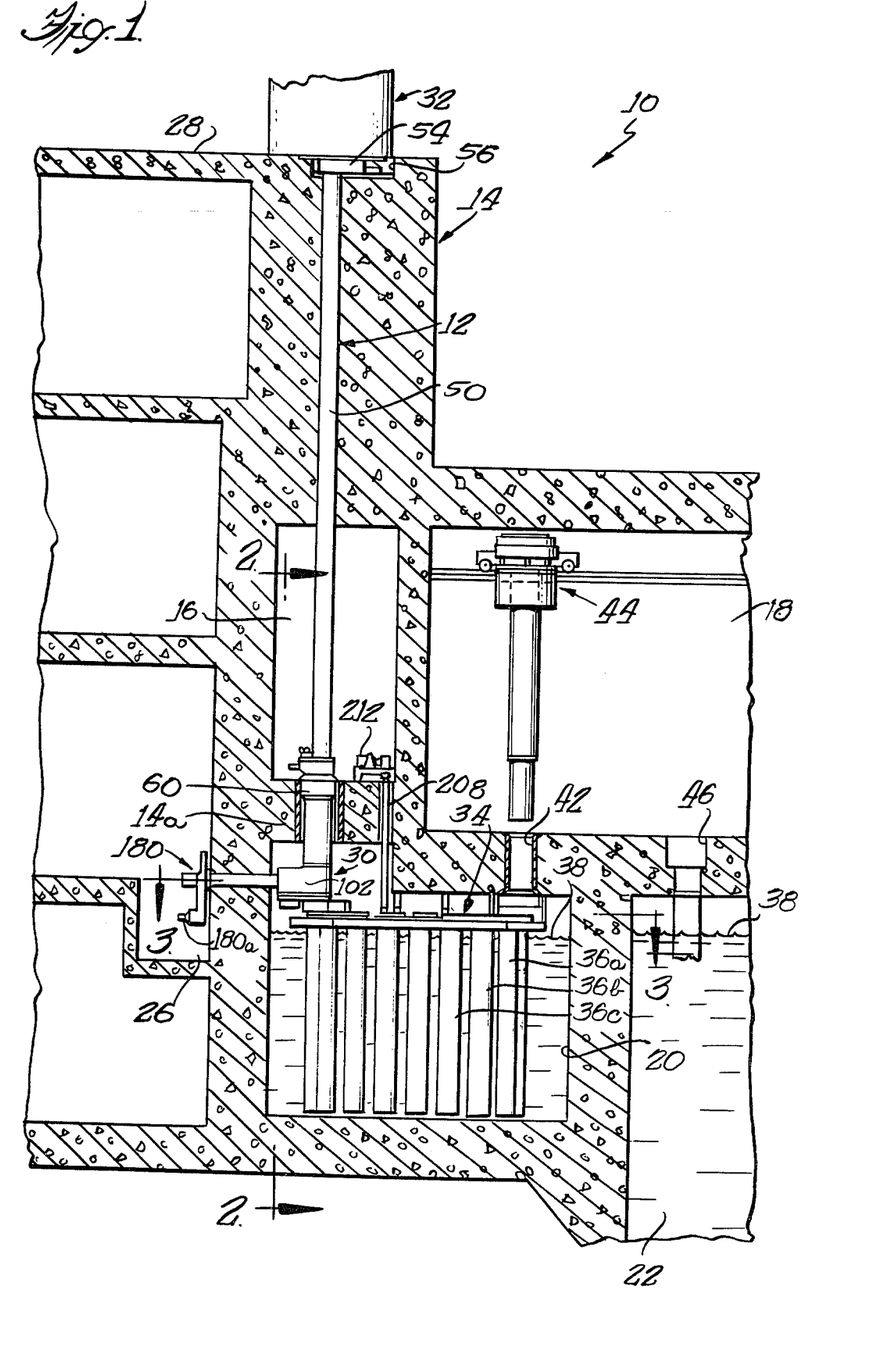
FIG. 1 is a fragmentary vertical sectional view taken through a confinement area housing the various portions of the nuclear reactor fuel and reflector element sealing, canning and inspection system in accordance with the present invention.
Figure 2:
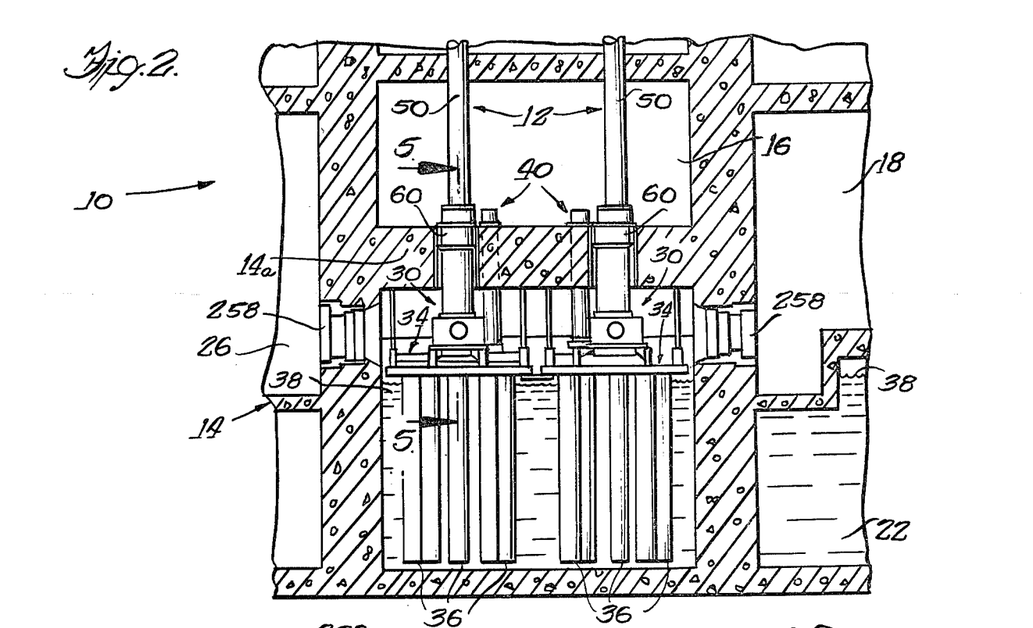
FIG. 2 is a fragmentary vertical sectional view taken substantially along line 2—2 of FIG. 1, looking in the direction of the arrows.
Figure 3:
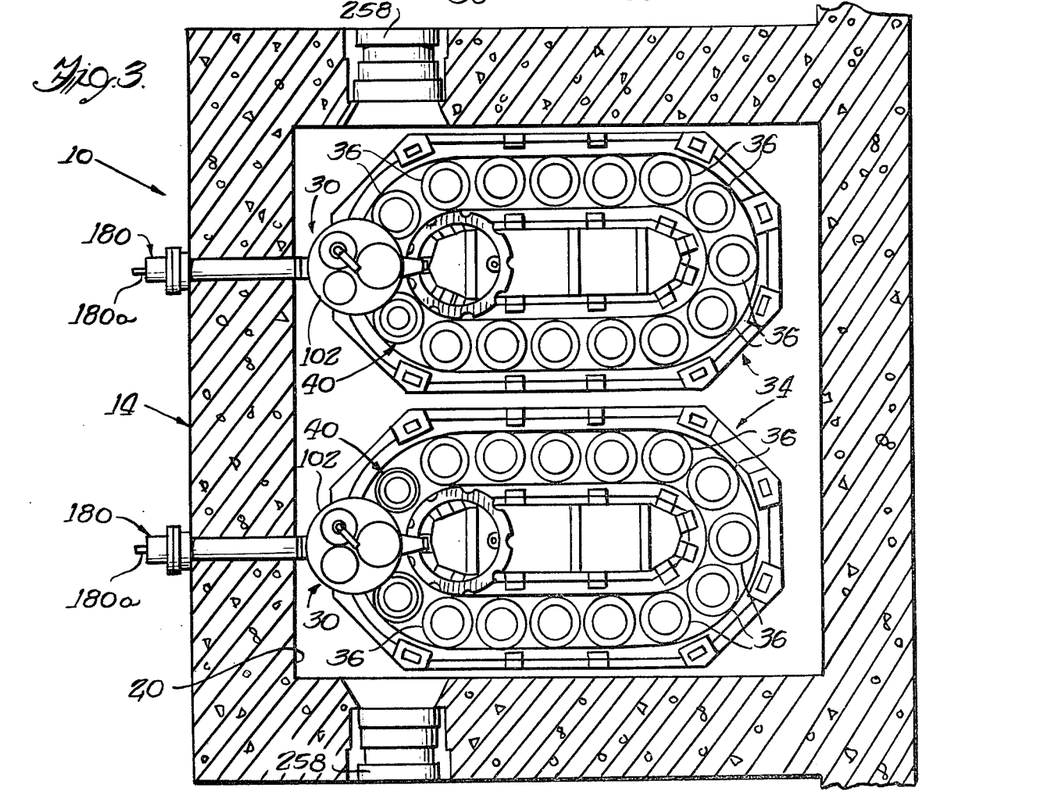
FIG. 3 is a fragmentary horizontal sectional view taken substantially along line 3—3 of FIG. 1, looking in the direction of the arrows.

Referring now to the drawings, and in particular to FIGS. 1-3, a system for canning and inspection of fuel and reflector elements of a nuclear reactor while transferring the elements from a fuel transfer cask to a storage area is indicated generally at 10. The system 10, which may alternatively be termed a fuel canning system for a nuclear reactor, is adapted for remote control and facilitates transfer and canning of fuel and reflector elements while maintaining the elements in a gaseous environment sealed against egress of radioactive contaminants and ingress of air. As will become more apparent hereinbelow, the system 10 overcomes the problems heretofore associated with maintaining a large gas-filled facility for handling fuel and reflector elements of a nuclear reactor, and more particularly the problems associated with maintaining gas purity in a cell containing quantities of cooling water separated from a gaseous environment by dynamic seals. The system of the present invention is adapted to isolate the gaseous environment to those areas surrounding the radioactive fuel and reflector elements.

The nuclear reactor fuel and reflector elements with which the present invention relates are of known design and may have hexagonal external configurations with longitudinal control rod and coolant flow passages therein. For purposes of the present description, only the term fuel element will be used, it being understood that this term is to encompass both fuel and reflector elements.

Very generally, the illustrated system 10 includes a pair of parallel transfer chutes 12 housed within a suitable reinforced concrete building or housing 14 which defines an internal maintenance chamber or cell 16, an internal fuel transfer hoist chamber 18, an internal conveyor chamber 20 and an internal fuel storage chamber 22, the various chambers having suitable radioactive shielding and the conveyor chamber and fuel storage chamber being in generally underlying relation to the maintenance chamber 16 and fuel transfer hoist chamber 18, as best seen in FIG. 1. An inspection area 26 is formed in the housing 14 so as to preferably extend about at least three sides of the conveyor chamber 20 at an elevation suitable to facilitate inspection of fuel elements during canning and transfer thereof to and from the storage chamber 22.

The transfer chutes 12 extend from adjacent an upper surface 28 of the housing 14 downwardly through the maintenance chamber 16 and into the conveyor chamber 20 where the transfer chutes terminate in environmental chambers, each of which is indicated generally at 30. Each transfer chute 12 is adapted to receive radioactive fuel elements from an associated fuel transfer cask of known design, a portion of one being indicated at 32 in FIG. 1, and transfer the fuel elements downwardly through the environmental chamber 30 to corresponding conveyor means 34 housed within the conveyor chamber 20. Each conveyor means 34 includes a plurality of watertight chambers 36a, b, c, d, etc. which, for cooling purposes, are submerged in water 38 for the greater part of their lengths. As will become more apparent hereinbelow, the watertight conveyor chambers 36a, b, c, etc. define conveyor stations selected ones of which further define fuel element receptacles in the form of shipping containers having releasable sealing lids, and others of which define inspection tables for the fuel and reflector elements. The conveyor chambers are selectively movable along the endless paths of the conveyors to positions underlying the corresponding environmental chambers 30, associated canning machines, indicated generally at 40 in FIGS. 2 and 3, and inspection areas to be described. The conveyor means 34 are also operative to move the conveyor chambers 36a, b, c, etc. to positions underlying corresponding fuel transfer tubes 42 (FIG. 1) formed in the housing 14 and through which a lift hoist 44 is operative to remove sealed fuel containers from the conveyor chambers and transfer the containers through corresponding passages 46 to the fuel storage chamber 22 which is also water filled.

Figures 4, 11:
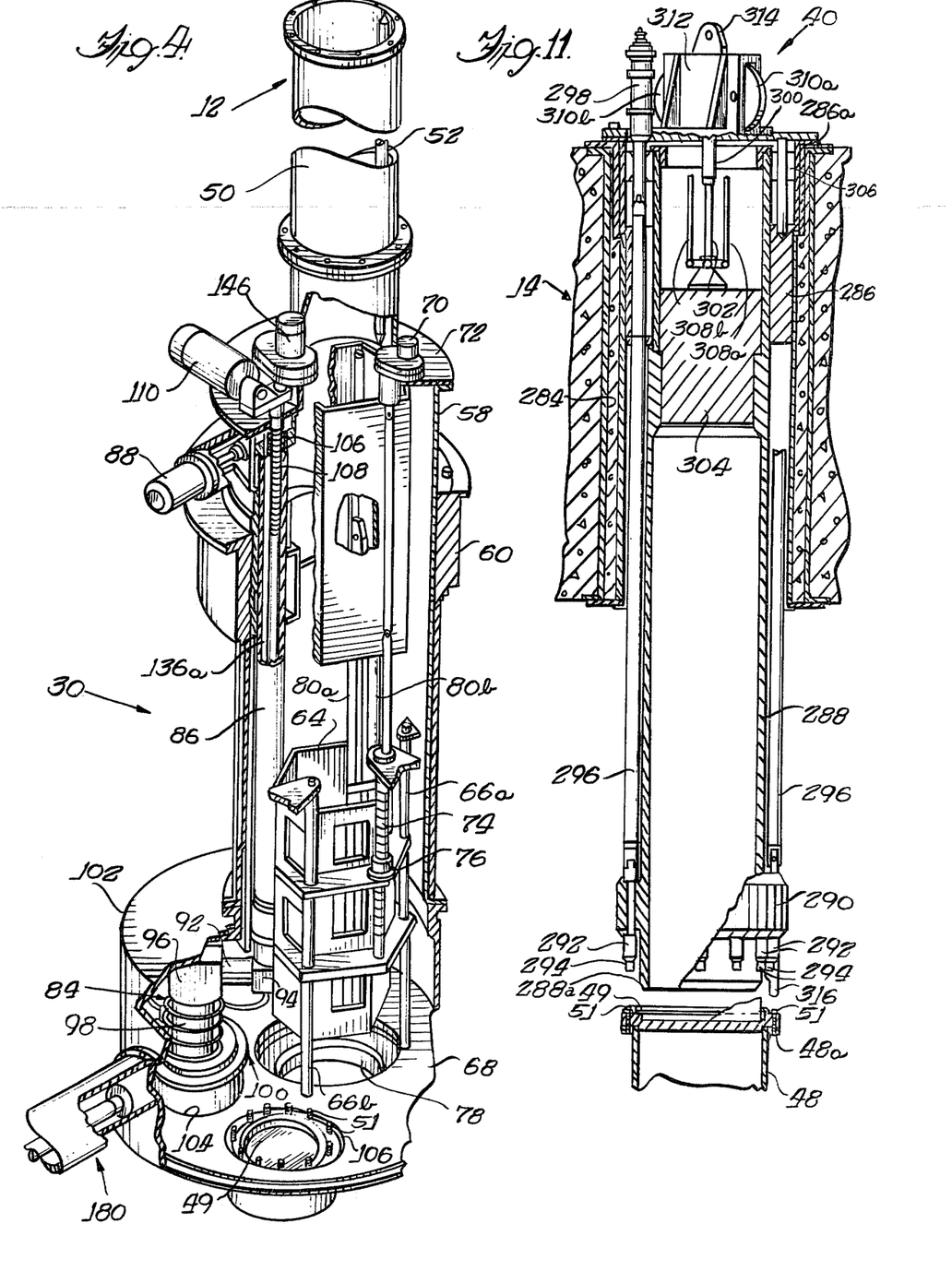
FIG. 4 is an enlarged fragmentary perspective view, partly in section, illustrating the transfer chute and associated environmental chamber and grapple mechanism employed in the system of FIG. 1.
FIG. 11 is a fragmentary view, partially in section, of a canning machine as employed in the system of the present invention.
Figures 5, 6:
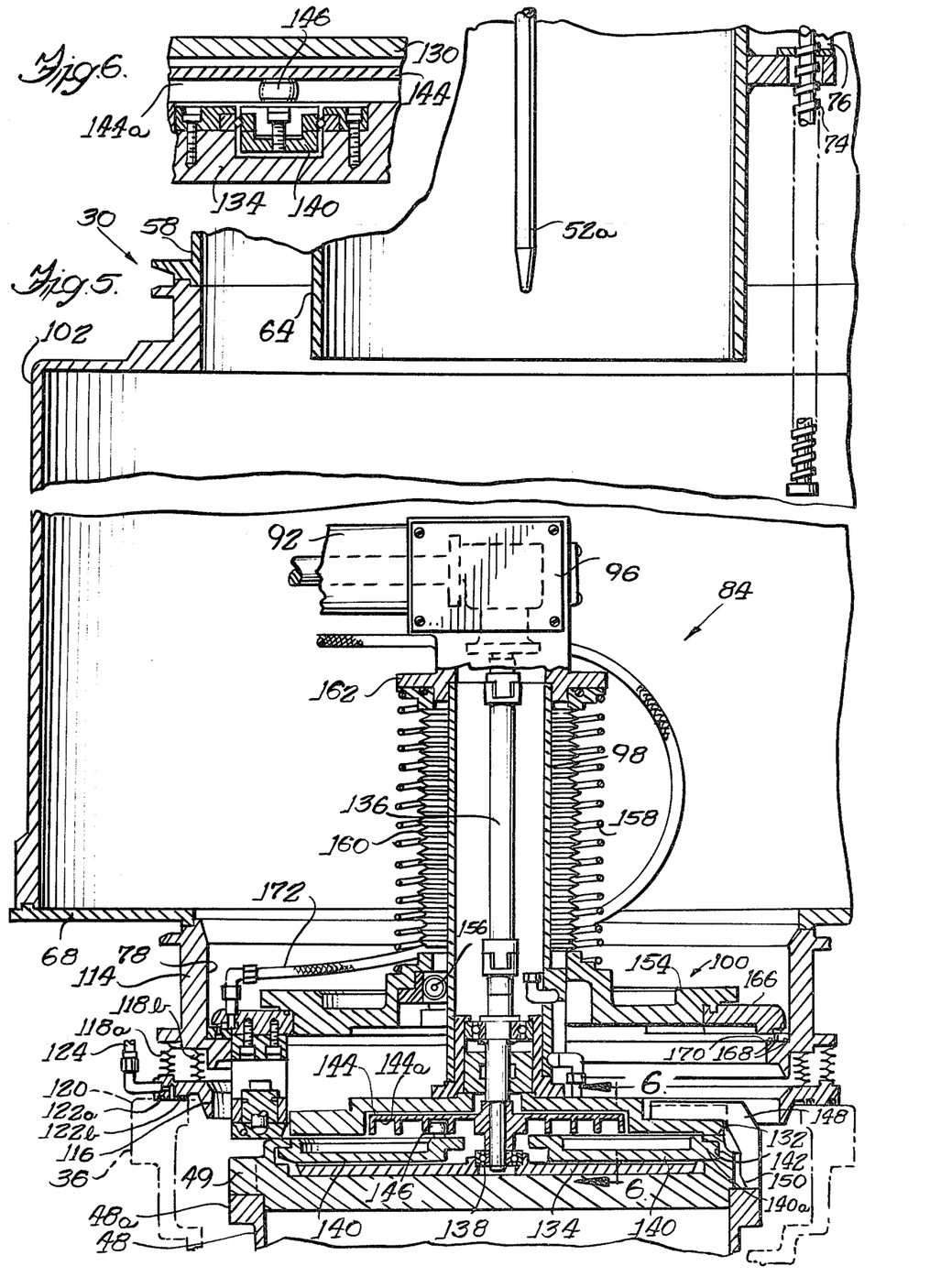
FIG. 5 is a foreshortened fragmentary longitudinal sectional view, on an enlarged scale, taken substantially along line 5—5 of FIG. 2 and illustrating the grapple mechanism in operative association with an underlying container lid.
FIG. 6 is a fragmentary sectional view taken substantially along the line 6—6 of FIG. 5, looking in the direction of the arrows.
Figures 8, 9, 10, 10A:
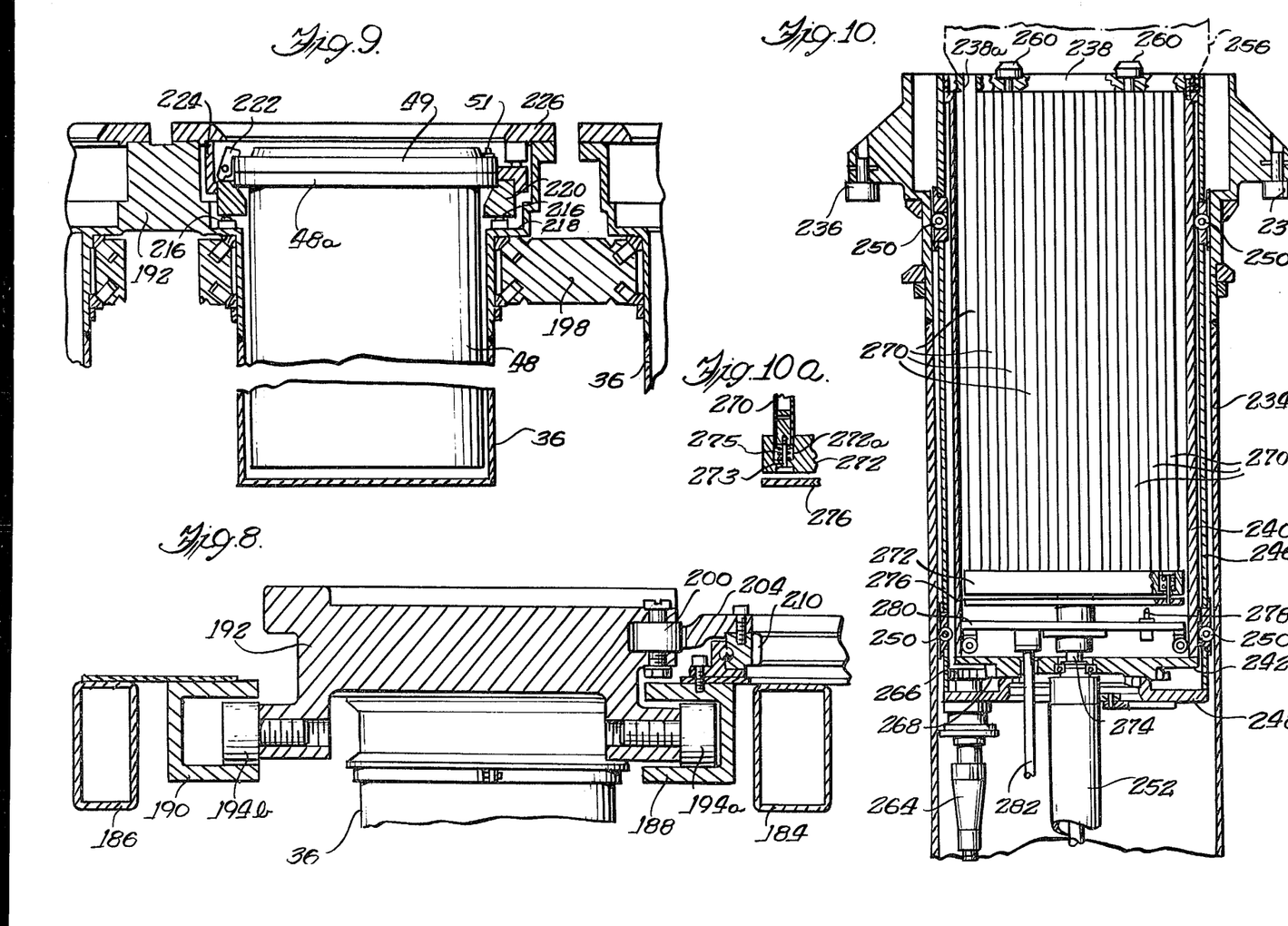
FIG. 8 is a fragmentary sectional view taken substantially along line 8—8 of FIG. 7.
FIG. 9 is a fragmentary sectional view taken substantially along line 9—9 of FIG. 7, looking in the direction of the arrows.
FIG. 10 is a fragmentary sectional view taken substantially along line 10—10 of FIG. 7, looking in the direction of the arrows, illustrating an inspection station carried by the conveyor.
FIG. 10a is an enlarged fragmentary view showing the manner of mounting the inspection probes employed in the inspection station of FIG. 10.

A container of the type carried within selected ones of the container chambers 36 on the conveyor means 34 is partially illustrated at 48 in FIGS. 5, 9 and 11. The containers 48 comprise watertight cylindrical tubular containers having open upper ends and peripheral upper lid mounting flanges 48a. A container cover lid 49 is releasably mounted on the upper end of each container 48 through a plurality of fasteners in the form of circumferentially spaced screws 51 preferably having hexagonal shaped heads to facilitate removal and tightening by a canning machine 40 as will be described more fully hereinbelow. The screws 51 are held captive in the associated container lids 49 through threaded connection therewith and are adapted for threaded engagement with the mounting flanges 48a on the containers.

TRANSFER CHUTE AND ENVIRONMENTAL CHAMBER

Turning now to a more detailed description of the system 10, and particularly to one of transfer chutes 12 and its corresponding environmental chamber 30, and having reference to FIGS. 1-6, the major length of the transfer chute 12 is defined by a cylindrical tubular guide sleeve 50 having an orientation rib or key 52 secured to its inner surface so as to extend longitudinally of the guide sleeve. The tubular guide sleeve 50 terminates at its upper end in a floor valve 54 (FIG. 1) of known design adapted to be remotely operated to selectively open and close the upper end of the sleeve 50 so as to effect a fluid-type seal therewith when in closed position. The floor valve 54 is mounted within a recess 56 in the housing 14 so that a fuel transfer cask 32 may be moved to a position overlying the floor valve 54.

The fuel element transfer cask 32 is of known design and includes internal hoist or grapple means (not shown) adapted to be lowered through the bottom of the transfer cask to facilitate loading of fuel and reflector elements into the transfer cask at the location of a reactor core, and thereafter individually lower the fuel and reflector elements into the transfer chute 12 through the floor valve 54 after movement of the transfer cask to overlie chute 12.

The guide sleeve portion 50 of each transfer chute 12 terminates at its lower end in its corresponding environmental chamber 30. Each environmental chamber 30 includes an upper tubular wall 58 mounted internally of an annular mounting sleeve 60 secured within a wall 14a of the concrete housing 14. An upper hexagonal shaped guide sleeve 62 is fixedly supported within the tubular wall 58 so as to axially underlie the upper tubular guide sleeve 50, and is adapted to receive and guide fuel elements downwardly therethrough when lowered by the grapple of the fuel transfer cask 32.

A lower hexagonal shaped guide sleeve 64 is mounted within the environmental chamber 30 for axial sliding movement on a pair of parallel upstanding support rods 66a and 66b fixed at their lower ends to a horizontal floor plate 68 and secured at their upper ends to the tubular wall 58. An electric guide sleeve drive motor 70 is mounted within the maintenance area 16 on an upper end plate 72 of the environmental chamber 30 and is operable to rotate a ball screw shaft 74 having connection at 76 with the movable guide sleeve 64 to facilitate movement of the lower guide sleeve between an upper position axially abutting the lower end of the upper guide sleeve 62 and a lower position projecting downwardly through a circular opening 78 in the floor plate 68 axially aligned with the tubular wall 58. A pair of parallel guide bars 80a and 80b are mounted on the lower guide sleeve 64 and cooperate with the upper guide sleeve 62 to effect axial registration therewith. The upper and lower sleeves also carry orientation ribs 52a (FIG. 5) for registration with the transfer cask grapple when lowering or raising a fuel element through the environmental chamber 30.

As best seen in FIGS. 4-6, a grapple mechanism means, indicated generally at 84, is supported within the environmental chamber 30 and is operable to handle container lids 49 for containers 48 disposed within selected ones of the conveyor chambers 36. The grapple means 84 includes a tubular spline shaft 86 mounted at its upper end to the end plate 72 and connected to an electric control motor 88 through a spline and worm gear arrangement (not shown) to facilitate selective rotation of the spline shaft 84 about its longitudinal axis.

A radial tubular arm 92 is mounted on the lower end of the tubular spline shaft 86 through a right angle bevel gear housing 94. A second right angle bevel gear housing 96 is secured to the outer end of the radial arm 92 and supports a vertical tubular arm 98 having a grapple head 100 mounted on its lower end. The grapple head 100 and associated support arms 98 and 92 are located within an enlarged area of the environmental chamber 30 defined internally of a cylindrical housing 102 secured eccentrically to and communicating with the lower end of the tubular wall 58. The grapple head 100 and associated support arms 98 and 92 are adapted for rotation about the axis of the spline shaft 86 to effect movement of the grapple head to a position axially overlying the circular access opening 78 in the bottom end plate 68, or to a position overlying either one of two container lid storage chambers 104 and 106 formed in the end plate 68. The chambers 104 or 106 may be employed to temporarily store the container lids 49 for the containers 48, or may store new container lids and receive damaged lids, as will become more apparent hereinbelow.

To effect raising and lowering of the grapple means 84 relative to the lower end 68 of the environmental chamber 30, the upper end of the spline shaft 84 carries a ball screw housing 106 which has cooperative relation with a helically grooved ball screw shaft 108 rotatable through an electric elevator drive motor 110 supported on the upper end plate 72 within the maintenance chamber 16. Energizing the drive motor 110 effects rotation of the screw shaft 108 to raise the spline shaft 84 and thus the grapple head 100 relative to the floor plate 68 of the environmental chamber.

The circular access opening 78 in the environmental chamber 30 is defined by an annular housing 114 secured at its upper end to the floor plate 68. The housing 114 supports an annular ring seal 116 through a pair of concentric metallic bellows 118a and 118b. The metallic bellows 118a, b are normally maintained in compressed conditions holding the annular seal ring 116 raised clear of the underlying conveyor means 34 and associated chambers 36. When it is desired to effect a sealing relation between the environmental chamber 30 and an underlying conveyor chamber 36, pressure is applied to the interspace between the bellows 118a, b to extend the bellows and press the sealing ring 116 into contact with an upper surface 120 on an axially underlying chamber 36, the sealing ring preferably having a pair of suitable concentric sealing rings 122a, b mounted thereon for this purpose. Preferably, a gas line 124 has communication with the surface of the sealing ring 116 in which the ring seals 122a, b are disposed, and is operative to flush the upper surface 120 of an underlying chamber 36 with a suitable gas so as to clean the same as the sealing ring is brought into sealing engagement therewith. The gas ejected to flush the surface 120 also serves to provide a buffer within the area underlying the grapple head so as to prevent ingress of air.

The grapple head 100 is operative to remove container lids 49 from their associated containers 48 when axially underlying the access opening 78, and thereafter replace the container lids after removing and/or inserting a fuel element into the underlying container. To effect manipulation of the container lids 49, the grapple head 100 includes a circular housing plate 130 which is suitably fixed to the lower end of the tubular support arm 98, as best seen in FIG. 5. The housing plate 130 is adapted to engage an annular surface 132 on an underlying lid 49, either during pickup of a lid from one of the storage chambers 104 or 106, or when moving the grapple head into position to remove a container lid from its associated container 48. A grapple plate 134 is carried on the lower end of a grapple control shaft 136 through a bearing 138 and cooperates with the housing plate 130 to support a plurality of radially reciprocal latch members 140 which are movable between inner positions disposed between the plates 130 and 134 and outer positions wherein outer ends 140a of the latch members engage an annular groove 142 formed in each of the container lids 49.

Radial movement of the latch members 140 is effected by a cam plate 144 having a helical cam groove or slot 144a in its lower surface which receives a roller 146 mounted on the upper surface of each of the latch members 140. The cam plate 144 is fixed on the grapple control shaft 136 so that rotation of the grapple control shaft is operative to rotate the cam plate and, because of the helical shape of the cam groove 144a, effect radial outward or inward movement of the associated latch members 140 depending upon the direction of rotation of the cam plate. The control shaft 136 is connected through suitable right-angle bevel gear connections within the gear housings 96 and 94 to an upper grapple control shaft 136a the upper end of which extends coaxially upwardly through the screw shaft 108 and is connected to an electric grapple drive motor 146 mounted on the upper end plate 172 within the maintenance chamber 16.

Preferably, one or more grapple keys, such as shown at 148 in FIG. 5, are carried by the grapple housing plate 130 and are adapted to be received within suitable radial slots 150 formed in the container lids 49 to prevent rotation of the container lid during manipulation by the grapple head 100. Microswitches (not shown) are provided in suitable locations to indicate contact of the grapple housing 130 with a container lid 49 and for indicating engaged or disengaged positions of the latch members 140.

It is desirable that the access opening 78 in the bottom end plate 68 of the environmental chamber 30 be sealed closed when the sealing ring 116 is in its upper position disconnected from an underlying conveyor chamber 36 so that a gaseous atmosphere (or a vacuum) may be maintained in the environmental chamber 30. To this end, the grapple head 100 carries a floating flange 154 on the tubular arm 98 through circumferentially spaced guide rollers, one of which is shown at 156 in FIG. 5. The floating flange 154 is recessed within its lower surface so as to nest with the grapple housing plate 130 and is urged against the grapple housing plate by a coil compression spring 158. A metallic bellows seal 160 is mounted concentrically of the tubular arm 98 within the compression spring 158, and has its upper end sealingly secured to a radial flange 162 on the gear housing 96. The lower end of the bellows seal 160 is sealingly secured to the floating flange 154. An annular sealing plate 166 is carried by the floating flange 154 and has a pair of suitable annular seals 168 mounted thereon for engagement with an annular shoulder surface 170 formed on the housing 114 when the grapple head is moved downwardly through the access opening 78 to lace a container lid 49 on an underlying container 48, or when removing a container lid therefrom. During sealing engagement of the sealing plate 166 with the shoulder surface 170 on the housing 114, the interior of the environmental chamber 30 is sealed against both egress of gas, such as helium, therefrom and ingress of air or other undesirable gas into the environmental chamber. A gas line 172 has connection between a source of suitable gas and the sealing surface of the seal housing 166 to facilitate cleaning of the sealing surface 170 prior to contact therewith. Such gas also provides a buffer media when the closure is made.

Four equidistantly circumferentially spaced power rams, one of which is shown at 174 in FIG. 5, are mounted on the lower surface of the sealing plate 166 and are adapted to engage an underlying container lid 49 for securing the lid against the associated container mounting flange 48a during actuation of the latch members 140.

To facilitate observation within the environmental chambers 30, and particularly the grapple heads 100 and associated support structures, a suitable telescope and lighting device 180 is interconnected to each enlarged environmental chamber housing 102 so as to extend outwardly into the inspection area 26. Each device 180 has an outer control end 180a which permits manipulation for viewing within its associated environmental chamber.

CONVEYOR

Figure 7:
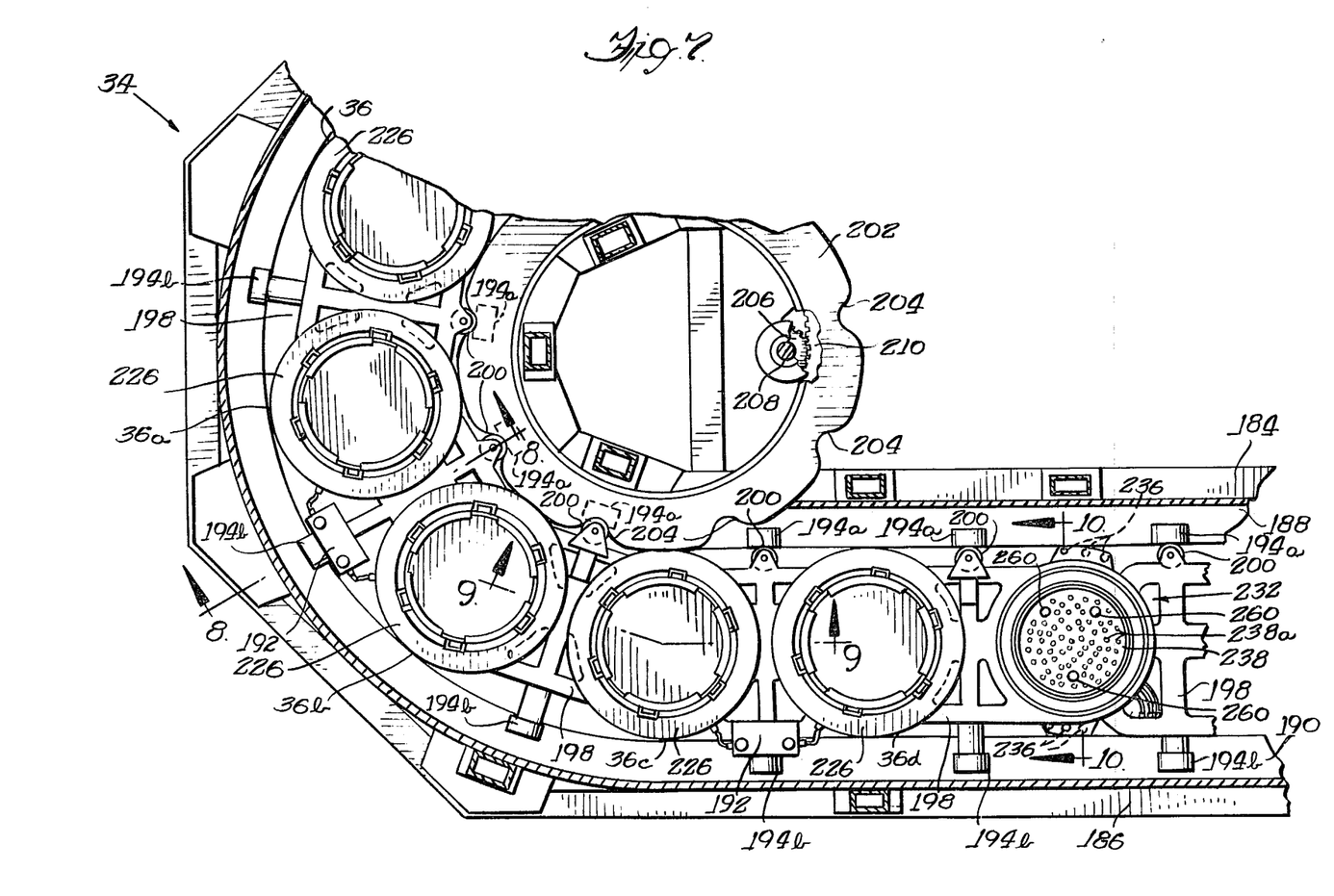
FIG. 7 is an enlarged fragmentary view of one of the conveyors shown in FIG. 3.

Taking one of the conveyor means 34 as representative of the two conveyors in the illustrated embodiment of the system 10, and with particular reference to FIGS. 7-9 taken in conjunction with FIGS. 1-3, each conveyor means 34 includes a pair of parallel over-shaped frame members 184 and 186 supported within the conveyor chamber 20 to define an endless path through which the chambers 36 may be moved to effect underlying axial alignment of the axis of each chamber with the access opening 78 in the environmental chamber 30. The frame members 184 and 186 support mutually facing C-shaped tracks 188 and 190, respectively, which cooperate to define a track along which the conveyor chambers 36 are conveyed. The conveyor means 34 preferably supports a number of watertight chambers 36 sufficient to provide storage for one refueling zone inventory of a reactor core, the watertight chambers 36 being interconnected for articulated movement so as to readily traverse the oval guide path.

The chambers 36 are formed in pairs of two parallel spaced chambers interconnected through a housing link 192 formed integral with or otherwise secured to the associated pair of spaced chambers. Each housing link 192 is supported by a pair of guide rollers 194a and 194b which are received within and guided along the tracks 188 and 190, respectively. The juxtaposed chambers 36 which are not fixedly connected through a housing link 192 are interconnected for articulated movement therebetween through housing links or connecting frames 198 which are also supported by pairs of guide rollers 194a and 194b received within the tracks 188 and 190. The housing links 192 and 198 maintain fixed spacing between the chambers 36 as they are conveyed along the guide path defined by the tracks 188 and 190.

To effect movement of the chambers 36 along the guide tracks, the housing links 192 and 198 each rotatably support a drive roller 200 adapted for cooperation with an annular drive sprocket 202. The drive sprocket has a plurality of equidistantly circumferentially spaced recesses 204 formed therein to receive successive ones of the drive rollers 200 during rotation of the drive sprocket. Rotation of the drive sprocket is effected by a drive pinion 206 secured to the lower end of a conveyor drive shaft 208 and having mating engagement with an internal ring gear 210 mounted on the sprocket 202. The conveyor drive shaft 208 is connected at its upper end to a suitable electrical drive motor 212 supported within the maintenance chamber 16, as shown in FIG. 1. A normally engaged pneumatically releasable locking latch (not shown) is operable to prevent movement of the conveyor chambers 36 when the environmental chamber seal ring 116 is engaged with one of the chambers 36 or when the canning machine, to be described hereinafter, is engaged with a container carried within one of the chambers 36. The locking latch is preferably provided with suitable interlocks (not shown) which prevent withdrawal of the locking latch until safety signals indicate safe conditions for moving the conveyor.

Referring particularly to FIG. 9, each chamber 36 has stepped diameters at its upper end and supports a plurality of transfer balls 216 on an annular surface 218 within the chamber. The transfer balls 216 underlie and support a self-centering support ring 220 on which the annular flange 48a of a container 48 may be supported internally of the watertight chamber 36. The support ring 220 compensates for possible misalignment when a container 48 is moved to a position underlying the access opening 78 in the environmental chamber 30, or when a container is moved to a position axially underlying the canning machine 40 or the lifting hoist 44.

Preferably, a plurality of latches 222 are pivotally mounted on an annular support ring 224 circumferentially of the upper end of the watertight chamber 36 and are operative through pneumatic actuating means (not shown) to engage the upper surface of a container lid 49 and maintain the lid in normally sealed relation with its underlying container 48. An annular plate 226 is mounted on the upper end of the chamber 36 to maintain the latch support ring 224 and self-centering ring 220 in assembled relation within the upper end of the chamber.

INSPECTION TABLE

At least one station on each of the conveyors 34 includes inspection table means, indicated generally at 232, on which fuel and reflector elements can be placed for both mechanical and visual inspection. With particular reference to FIGS. 10 and 10a, taken in conjunction with FIG. 7, the inspection table means 232 includes a watertight cylindrical tubular casing 234 supported by housing links 192 and 198 in a manner similar to the watertight chambers 36 for movement along the guide path defined between the tracks 188 and 190. The upper end of the casing 234 has rollers 236 mounted thereon in generally diametrically opposed relation for centering engagement with the mutually facing upper edges of the guide tracks 188 and 190 during movement along the conveyor path.

The inspection table means 232 includes an upper circular support table or platform 238 mounted on the upper end of a cylindrical tubular wall 240 which has a circular gear housing 242 secured to its lower end. The support table 238 and associated cylindrical wall 240 are rotatable within a sleeve 246 having an annular bearing support plate 248 secured to its lower end. The sleeve 246 is adapted for axial telescoping movement relative to the outer casing 234 through rollers 250 secured in circumferentially spaced relation to the sleeve 246 for rolling engagement with the internal surface of the outer wall 234. Axial movement of the support table 238 and associated wall 240 is effected by a double acting pneumatic cylinder or ram 252 the upper end of which is secured to the bearing support plate 248. The double acting cylinder 252 has a first piston (not shown) extendible from its lower end to effect axial movement of the gear housing 242, support plate 248 and support table 238 between upper positions, as shown in FIG. 10, and lowered positions retracted within the outer casing 234 to lower a fuel or reflector element, a portion of which is shown in phantom at 256 in FIG. 10, below the upper surface of the associated conveyor 234 so that the fuel element clears the environmental chamber 30 during movement of the inspection table along the path of the conveyor 34.

When it is desired to inspect a fuel element, the inspection table means 232 is advanced to a position axially underlying the access opening 78 in the environmental chamber 30 by operation of the conveyor drive motor 212. With the grapple head 100 moved to a position clear of the opening 78, a fuel element may be transferred downwardly through the transfer chute 12 and positioned on the underlying support table 238. Thereafter, the support table may be lowered through the double acting cylinder 252 and the inspection station advanced to a position generally adjacent a viewing window 258 mounted within the housing 14, as best seen in FIGS. 2 and 3. Alternatively, a periscope or closed-circuit TV may be mounted within the housing 14 or internally of the conveyor chamber 20 to facilitate inspection of the fuel elements. A pair of locating dowels 260 are mounted on the support table 238 for registration with correspondingly located recesses in the lower surfaces of fuel elements to effect desired registration of the fuel elements on the support table 238.

When the inspection table means 234 has been moved to a desired inspection position, the actuating cylinder 252 is pressurized to raise the support table 238 and associated fuel element to a position generally level with the upper surface of the conveyor 34 for visual inspection. With the fuel element in a raised position, the support table may be rotated through a pneumatic motor 264 having a drive pinion 266 thereon engaging a ring gear 268 on the gear housing 242. The gear housing 242 is interconnected to the upper end of the cylinder 252 and to the bearing support plate 248 through suitable bearings.

The fuel and reflector elements 256 conventionally have cooling channels extending longitudinally therethrough which may become obstructed so as to adversely effect cooling of the fuel and reflector elements during operation within a reactor core. To facilitate mechanical inspection of the cooling channels within a fuel or reflector element, the inspection table means 232 includes a plurality of elongated parallel probes 270 mounted in upstanding relation on a circular base plate 272 and extending through corresponding axially aligned openings 238a formed in the inspection table 238. The base plate 272 is mounted on the upper end of an extendible piston rod 274 adapted for outward extension from the upper end of the double acting cylinder 252 so as to extend the probes 270 upwardly through the support table 238 and into the cooling channels within the fuel or reflector element supported on the support table.

As best seen in FIG. 10a, each of the inspection probes 270 is axially slidable within a bore 272a in the base plate 272 and is retained therein by a bolt 273 against the upward bias of a compression spring 275. The probes 270 are thus downwardly movable relative to the base plate 272 in the event any of the probes encounters an obstruction within its corresponding cooling channel in the fuel element being inspected. Such downward movement of a probe 270 serves to effect engagement of its corresponding bolt 273 with a guide plate 276 supported by the mounting plate 272 so as to move the guide plate downwardly to actuate a limit switch 278 mounted on a plate 280 which is also fixed on the upper end of the piston 274. The limit switch 278 is connected in circuit to provide a signal to the operator that an obstruction has been encountered and may also be operative to deenergize the cylinder 252. A guide rod 282 is secured to the lower surface of the plate 280 and extends through a suitable opening in the gear housing 242 to prevent rotation of the inspection probes 270 about the axis of the piston rod 274. Suitable instrumentation (not shown) may be provided to indicate to the operator the vertical positions of the support table 238 and inspection probes 270 during an inspection operation.

When retracted below the upper surface of the conveyor 34, the support table 238 may be employed to store container lids 49 in addition to those stored in the storage chambers 104 and 106 in the environmental chamber 30. It will be appreciated that if the fuel and reflector elements have different coolant channel patterns, more than one inspection table means 232 should be provided on each conveyor 34.

CANNING MACHINE

As aforedescribed, container lids 49 are normally secured on the upper ends of the containers 48 by screws or bolts 51 having threaded connection to the container mounting flanges 48a. To facilitate loosening and removal of the screws 51 of a container lid from its associated container preparatory to removing the lid, and to facilitate subsequent remounting of the container lid on the container, the system 10 includes a canning machine 40 overlying each of the conveyors 34. With reference to FIG. 11, taken in conjunction with FIGS. 2 and 3, a canning machine 40 is mounted within the housing 14 generally adjacent each environmental chamber 30 to facilitate removal of the hold-down screws or bolts 51 on a container lid 49 from the associated container flange 48a just prior to advancing the container to a position underlying the access opening 78 in the environmental chamber.

Each canning machine 40 is supported within a vertical penetration 284 in the housing 14, as shown in FIG. 11, and is removable from its penetration for servicing. Each canning machine 40 includes an outer annular member 286 having an upper radial flange 286a which supports the member 286 within and facilitates attachment to the penetration 284. A cylindrical tubular housing 288 is mounted interiorly of the annular member 286 for axial sliding movement therewithin, and has a lower annular flange 290 which carries a plurality of parallel discrete stub shafts 292 each of which has a bolt-head receiving socket 294 on its lower end. The stub shafts 292 are adapted to be rotated about their longitudinal axes within the flange 290 by corresponding torque rods 296 which extend upwardly through the annular member 286 and have connection to individual pneumatically operated bolt setters 298 of known design mounted within the maintenance chamber 16. The stub shafts 292 are mounted within the flange 290 so as to have a degree of vertical freedom and thereby accommodate varying rates of bolt displacement.

Axial movement of the inner tubular housing 288 and associated bolt sockets 294 is effected by a pneumatic cylinder or ram 300 having an extendible piston 302 connected to a counterweight 304 secured within the tubular housing 288 such that extension and retraction of the piston 302 effects a corresponding axial movement of the bolt sockets 294. An annular counterbalance weight 306 is disposed about the upper end of the inner tubular housing 288 and is connected to the counterweight 304 through cables 308a and 308b which are reeved over pulleys 310a and 310b, respectively, mounted within a suitable housing 312 secured to the upper end of the canning machine. A lift lug 314 is mounted on the housing 312 to facilitate removal of the canning machine 40 from its associated penetration 284.

With a container 48 and associated lid 49 clamped within a conveyor chamber 36 by the aforedescribed latches 222 and moved to a position axially underlying a canning machine 40, the pneumatic ram 300 may be energized to move the tubular body 288 to a downward position wherein a lower chamfered end 288a on the tubular housing 288 seats within the underlying container lid 49 as the housing 288 moves downwardly to engage the underlying container. At least one, and preferably three, locating keys 316 are mounted on the lower end of the housing 288 for registration with corresponding underlying slots 150 formed in the container lids in similar fashion to the operation of the aforedescribed grapple keys 148. The keys 316 assure proper orientation of the bolt sockets 294 with the bolts 51 in the container lid so that bolts may be removed from or run down into the threaded receiving bores in the container flange by the pneumatic bolt setters 298.

Indicator switches (not shown) are provided to indicate when the housing member 288 is fully seated within an underlying container lid 49. Indicator switches (not shown) are also preferably provided to indicate when each bolt 51 is engaged and seated. A system for torque sensing the preload on each bolt 51 is also preferably provided.

SUMMARY OF OPERATION

Having thus described the various elements of the system 10 in accordance with the present invention, its general operation will now be described. For purposes of example, the operation will be described in the transfer of a fuel element from the fuel transfer cask 32 to the storage area 22. Assuming that the bolts 51 securing a container lid 49 to its associated container 48 have been removed by a canning machine 40 in a manner as aforedescribed, and that the container lid is retained on the container through the latches 222 mounted on the associated watertight chamber 36 which has been moved to a position axially underlying the access opening 78 in the environmental chamber 30, and assuming further that the corresponding grapple head 100 is disposed in a position wherein its floating flange 154 has sealing relation with the annular housing 114, the sealing ring 116 is then moved downwardly to engage the underlying surface 120 on the chamber 36 in sealed relation therewith. As the sealing ring 116 and the floating flange 154 are moved into sealing engagement, respectively, with the underlying chamber 36 and annular housing 114, a suitable gas such as helium may be ejected at the sealing surfaces to clean the mating surfaces and establish a gaseous barrier preventing ingress of air. The space internally of the bellows 118b, sealed grapple head 100 and underlying chamber 36 may then be purged with a suitable gas such as helium.

After purging the area immediately surrounding the container 48 underlying the environmental chamber 30, the elevation motor 110 is energized to move the grapple means 84 downwardly to lower the grapple housing 130 until the grapple plate 134 is seated within the upper recessed surface of the underlying container lid 49. The grapple drive motor 146 is then energized to effect rotation of the cam plate 144 in a direction to move the latch members 140 radially into engagement with the annular groove 142 in the container lid. The elevation motor 110 is then reversed to raise the grapple head 100 and container lid 49 into the environmental chamber 30 whereupon the azimuth drive motor 88 is energized to move the grapple head to a position overlying either of the recesses 104 or 106. If the container lid is damaged or otherwise needs replacement, it is deposited within one of the recesses 104 or 106 and the grapple head is then moved to the other of the recesses to pick up a new container lid.

With the grapple head 100 removed from the access opening 78, the lower guide sleeve 64 is moved downwardly through the opening 78 to a position adjacent the underlying open ended container 48. The floor valve 54 is then opened and a fuel or reflector element is lowered into a transfer chute 12 from the transfer cask 32 which has previously been moved to a position overlying the floor valve 54. The fuel or reflector element is lowered from the transfer cask by the transfer cask hoist downwardly through the upper and lower guide sleeves 62 and 64 into the underlying container 48.

After loading a fuel or reflector element into a container 48, the floor valve 54 is again closed and the lower guide sleeve 64 is retracted to its upper position within the environmental chamber 30. The grapple head 100 is then moved to a position overlying the access opening 78 by energizing the motor 88, and the motors 110 and 146 are again energized in sequence to lower the grapple head 100, which has retained the previously removed lid or has picked up a new replacement lid, and placed the container lid on the underlying container after which the grapple head 100 is released from the container lid and the latches 222 are again actuated to clamp the container lid firmly in place.

After the container lid 49 is placed on the container 48 and the latch members 140 retracted, the grapple housing 130 is raised to a position nesting with the floating sealing flange 154 to clear the conveyor 34. The conveyor chamber 36 and associated container 48 underlying the environmental chamber opening 78 are now moved to a position axially underlying the associated canning machine 40 whereupon the screws or bolts 51 carried by the container lid are run down into the underlying container flange 48a to firmly secure the lid in sealed relation to its underlying container in a manner as aforedescribed.

From the canning machine 40, the sealed container and internal fuel or reflector element may be advanced to a position underlying the transfer tube 42 whereupon the lifting hoist 44 may be moved downwardly to remove the sealed container from its associated chamber 36, raise the sealed container upwardly within the transfer hoist chamber 18 and move it to a position overlying the passage 46 whereupon the hoist 44 can lower the sealed container down into the fuel storage chamber 22 which is filled with water to a height sufficient to totally cover the fuel element containers.

Movement of the fuel element containers 48 from the storage chamber 22 to a conveyor 34 from which the container is moved to underlie the environmental chamber 30 and the fuel or reflector element transferred upwardly to the fuel transfer cask is effected in a reverse procedure to that just described.

When it is desired to inspect a fuel or reflector element, an inspection table means 232 on the conveyor 34 is moved to a position axially underlying the access opening 78 in the environmental chamber. The support table 238 is raised to the level of the upper surface of the associated conveyor 34 and sealing is effected with the sealing ring 116 in a similar manner to sealing with a chamber 36 as aforedescribed. A fuel or reflector element may then be lowered from the transfer cask to the support table 238 whereupon the support table is lowered through actuation of the double acting cylinder 252 to lower the fuel element sufficiently to allow movement to an inspection station. The support table 238 may then be raised to raise the associated fuel element, and the pneumatic motor 264 energized to rotate the fuel element for visual inspection thereof. The inspection probes 270 may then be raised through the double acting cylinder 254 for mechanically inspecting the cooling channels within the fuel or reflector element. Upon completing inspection, the fuel or reflector element may be lowered and again returned to a position underlying the environmental chamber 30 whereupon the fuel element may be moved back into the fuel transfer casks 32 or temporarily raised into the environmental chamber and then lowered into a container 48 which has been moved to a position underlying the environmental chamber through selective movement of the conveyor 34.

Having thus described the system 10 in accordance with the present invention, it is seen that a remotely controllable system for the transfer of fuel and reflector elements between a reactor vessel and a storage area is provided having capability to maintain the element in a gaseous environment sealed against egress of radioactive contaminants and ingress of air. The system is operative to effect canning of the fuel and reflector elements while maintaining the elements in a desired gaseous environment. This is accomplished by the environmental chamber 30, the grapple means 84, the underlying conveyor 34, and an associated canning machine 40. The associated environmental chambers, conveyors, and canning machines together remove and replace the closures of containers in which the fuel elements are sealed, and permit visual and mechanical inspection of the elements by operators located in remote shielded areas, while maintaining a predetermined gaseous atmosphere in the containers.

While a preferred embodiment of the system in accordance with the present invention has been illustrated and described, it will be understood to those skilled in the art that changes and modifications may be made therein without departing from the invention in its broader aspects.

Various features of the invention are defined in the following claims.

What is claimed is:

1. A system for handling and canning nuclear reactor fuel and reflector elements, comprising, in combination,
   housing means defining at least one shielded chamber,
   a generally upstanding transfer chute supported by said housing means and adapted to receive a fuel or reflector element therein from a transfer cask,
   an environmental chamber having communication with said shielded chamber and said transfer chute and adapted to receive a fuel or reflector element from said transfer chute,
   conveyor means disposed within said shielded chamber and including a plurality of upstanding watertight chambers selectively movable to a predetermined position underlying said environmental chamber, selected ones of said watertight chambers defining fuel element receptacles each of which is adapted to receive a fuel or reflector element therein and has a releasable cover lid operative to effect sealed relation with its corresponding receptacle,
   said environmental chamber having an access opening overlying said conveyor means so as to be substantially axially aligned with each of said conveyor chambers when moved to said predetermined position,
   and grapple means disposed within said environmental chamber and adapted for movement through said access opening to remove a cover lid from a receptacle disposed in said predetermined position and move said cover lid to a position within said environmental chamber facilitating entry of a fuel or reflector element into said receptacle through said access opening,
   said conveyor means being adapted to convey receptacles having fuel or refector elements therein from said predetermined position to a position facilitating movement of the fuel elements to a storage area.

2. The system as defined in claim 1 wherein said transfer chute defines an entry end, and including valve means operatively associated with said entry end and operable to close said entry end, and seal means operatively associated with said access opening of said environmental chamber and adapted to effect sealing relation between said access opening and a conveyor chamber when disposed in said predetermined position, said valve means and seal means facilitating gaseous purging of said transfer chute and environmental chamber when said valve means is closed and said seal means is disposed in said sealing relation with a conveyor chamber disposed in said predetermined positions.

3. The system as defined in claim 1 including a guide sleeve supported within said environmental chamber in substantially axial alignment with said transfer chute and being axially movable between a first position spaced from said access opening to facilitate free movement of said grapple means, and a second position extending through said access opening in substantially axially aligned relation to a conveyor chamber disposed in said predetermined position whereby to facilitate passage of a fuel or reflector element from said transfer chute into said conveyor chamber.

4. The system as defined in claim 1 wherein said conveyor means includes at least one inspection station movable to said predetermined position underlying said environmental chamber, said inspection station including a support table movable to a position generally adjacent said access opening to receive a fuel or reflector element thereon from said transfer chute, said table being movable to a position within said environmental chamber so as to lower the fuel or reflector element thereon below the upper level of said conveyor means.

5. The system as defined in claim 4 wherein said housing means defines a shielded inspection area, and including means communicating with said inspection area and said conveyor chamber and facilitating inspection of a fuel or reflector element supported on said support table when positioned at said predetermined position, and including means for moving said table to position the associated fuel or reflector element in a location to be observed from said inspection area.

6. The system as defined in claim 5 wherein the fuel elements to be inspected have longitudinal cooling channels therein, said inspection station including a plurality of inspection probes adapted to be moved through the cooling channels of a fuel element disposed on said support table to facilitate inspection of said cooling channels for detecting obstructions therein.

7. The system as defined in claim 6 wherein said support table has a support surface and includes a plurality of openings therethrough, said inspection probes being supported such that each probe is received through an opening in said support table, and including means for effecting axial movement of said probes relative to said table between positions below said support table and positions extending above said support table.

8. The system as defined in claim 1 wherein said fuel element receptacles comprise discrete containers adapted to be received within said selected ones of said watertight chambers, each of said containers having a releasable lid securable thereon in sealed relation therewith through a plurality of fasteners.

9. The system as defined in claim 8 including a canning machine supported by said housing means and adapted for cooperation with a container when disposed in axial relation therewith to release said fasteners from said containers prior to movement of the container to said predetermined position underlying said environmental chamber.

10. The system as defined in claim 9 wherein said fasteners comprise a plurality of headed screws supported by each of said container lids and adapted for threaded engagement with an associated container, said canning machine being adapted to simultaneously release all of the screws from their containers when positioned at said canning station.

11. The system as defined in claim 8 wherein said grapple means includes a sealing flange adapted to effect sealing engagement with said environmental chamber circumferentially of said access opening during movement of said grapple means to remove a lid from a container disposed in said predetermined position, said sealing flange being adapted to maintain a gaseous environment within said environmental chamber when said grapple means is extended through said access opening.

12. The system as defined in claim 1 wherein said environmental chamber includes lid storage areas for separately storing new and damaged lids.

13. The system as defined in claim 8 wherein said housing means further defines a storage area, and including hoist means adapted for transferring said containers from said conveyor means to said storage area.

14. The system as defined in claim 1 wherein said housing means defines at least two shielded conveyor chambers, and including an endless conveyor disposed within each of said conveyor chambers, each of said conveyors being adapted to sequentially move a plurality of watertight conveyor chambers and associated containers to a predetermined position, said system further including a transfer chute overlying each of said conveyors, an environmental chamber communicating with each of said transfer chutes and having an access opening disposed axially above an associated one of said predetermined positions, grapple means disposed within each of said environmental chambers, and sealing means operative to effect sealing relation between the interior of each environmental chamber and an axially underlying conveyor chamber when disposed in its said predetermined position below its associated environmental chamber, said grapple means being adapted to engage a container lid disposed in predetermined position below the associated environmental chamber and move said cover lid to a position facilitating entry of a fuel or reflector element into the associated container in the underlying conveyor chamber.

15. In a system for handling fuel and reflector elements of a nuclear reactor, the combination comprising housing means defining at least one shielded chamber,
a fuel element transfer chute supported by said housing means and adapted to receive a fuel or reflector element therein, an environmental chamber communicating with said fuel transfer chute and said shielded chamber and adapted to receive a fuel element from said chute,
endless conveyor means disposed within said shielded chamber and including a plurality of watertight chambers successively movable to a predetermined position underlying said environmental chamber, a container disposed within each of said watertight chambers and adapted to receive a fuel or reflector element therein, each of said containers defining a sealing surface peripherally of an upper open end thereof and having a cover lid releasably mounted thereon to close said open upper end,
said environmental chamber having an access opening overlying said conveyor means so as to be axially aligned with successive ones of said watertight chambers when disposed in said predetermined position,
seal means mounted on said environmental chamber circumferentially of said access opening and movable between a first position spaced from said conveyor and a second position in sealing engagement with a conveyor chamber when disposed in said predetermined position,
grapple means disposed within said environmental chamber for movement through said access opening to engage the cover lid of a container disposed in said predetermined position,
canning machine means supported by said housing in overlying relation to said conveyor means, said canning machine means being adapted to release the cover lid on an underlying container prior to movement of said container to said predetermined position underlying said environmental chamber,
said conveyor means including at least one inspection station movable to said predetermined position and operative to receive a fuel element thereon from said environmental chamber,
said housing means defining a shielded inspection area having means associated therewith for remotely observing a fuel element disposed on said inspection station,
said housing means further defining a storage area spaced from said shielded chamber,
and hoist means adapted to remove fuel element containers from said watertight conveyor chambers and move said containers to said storage area.

* * * * *